United States Patent [19]

Deichert

[11] Patent Number: 4,780,515

[45] Date of Patent: Oct. 25, 1988

[54] CONTINUOUS-WEAR LENSES HAVING IMPROVED PHYSICAL PROPERTIES

[75] Inventor: William G. Deichert, Macedon, N.Y.

[73] Assignee: Bausch & Lomb Incorporated, Rochester, N.Y.

[21] Appl. No.: 10,926

[22] Filed: Feb. 5, 1987

[51] Int. Cl.$^4$ .................... C08F 18/20; C08F 20/22
[52] U.S. Cl. .................... 526/245; 526/246; 526/279; 523/107; 528/32
[58] Field of Search ............ 526/245, 279, 246; 528/32; 523/107

[56] References Cited

U.S. PATENT DOCUMENTS

| | | | |
|---|---|---|---|
| 4,139,692 | 2/1979 | Tanaka | 526/218 |
| 4,153,641 | 5/1979 | Deichert | 260/827 |
| 4,235,985 | 11/1980 | Tanaka | 526/279 |
| 4,248,989 | 2/1981 | Novicky | 526/264 |
| 4,433,125 | 2/1984 | Ichinohe | 526/279 |
| 4,525,563 | 6/1985 | Shibata et al. | 526/245 |
| 4,540,761 | 9/1985 | Kawamura et al. | 526/245 |
| 4,602,074 | 7/1986 | Mizutami et al. | 526/245 |
| 4,625,007 | 11/1986 | Ellis et al. | 528/32 |

FOREIGN PATENT DOCUMENTS

| | | | |
|---|---|---|---|
| 2643055 | 4/1977 | Fed. Rep. of Germany | 528/32 |
| 61-98765 | 5/1986 | Japan | 526/279 |
| 6213453 | 1/1987 | Japan | 528/32 |

*Primary Examiner*—Joseph L. Schofer
*Assistant Examiner*—N. Sarofim
*Attorney, Agent, or Firm*—Christopher E. Blank; Craig E. Larson; Bernard D. Bogdon

[57] ABSTRACT

The physical properties of highly oxygen-permeable continuous-wear contact lenses, comprising a copolymer of an organosilicone monomer, a fluoroalkyl ester monomer and a hydrophilic monomer, are improved by the further addition of a linear polysiloxane oligomeric cross-linking agent with or without neopentylglycol dimethacrylate.

14 Claims, No Drawings

CONTINUOUS-WEAR LENSES HAVING IMPROVED PHYSICAL PROPERTIES

BACKGROUND OF THE INVENTION

This invention relates to hard contact lenses suitable for continuous wear, having high oxygen permeability and physical properties which provide improved suitability for manufacture and durability in use.

Contact lenses presently on the market are classified into two large groups: soft contact lenses and hard contact lenses. Hard contact lenses correct a broader range of visual defects than soft contact lenses, but are less comfortable to wear. The art has sought to increase oxygen permeability of hard contact lenses, thereby extending the length of time they can be worn without causing corneal damage or discomfort.

One proposed solution has been the formation of a copolymer of methyl methacrylate and a siloxane methacrylate compound. See U.S. Pat. Nos. 4,139,692 and 4,235,985. This solution has been less than satisfactory, since the lenses offered are not as hard, rigid, nor wettable as lenses formed from polymethyl methacrylate. In addition, such lenses are fragile and have poor mechanical processability.

Copending, commonly assigned U.S. patent application Ser. No. 734,898, describes an oxygen-permeable hard contact lens suitable for continuous wear, formed by copolymerizing at least one organosilicone monomer and at least one hexafluoroisopropyl ester of an unsaturated carboxylic acid. A hydrophilic monomer such as methacrylic acid may be included for wettability. A crosslinking monomer such as the multifunctional organosilicon branched-chain monomer 1,3-bis(γ-methacryloxypropyl)-1,1,3,3-tetra(trimethylsiloxy) disiloxane may also be included to control hardness. Other monomers may be added to adjust the physical properties of the lens.

Copending, commonly assigned U.S. patent application Ser. No. 764,421, describes very highly oxygen-permeable hard contact lenses formed by copolymerizing a generically defined siloxane mono or polyfunctional acrylate or methacrylate, at least one acryloxy or substituted acryloxy fluoroorgano monomer, at least one hydrophilic monomer, and at least one crosslinking agent to control hardness, a highly multifunctional organosilicon monomer being preferred as the crosslinking agent.

U.S. Pat. No. 4,433,125 describes an oxygen-permeable hard contact lens made of a copolymer comprising a silane or siloxane acrylate or methacrylate monomer and a fluoroalkyl acrylate or methacrylate monomer. Crosslinking monomers, such as ethylene glycol dimethacrylate, may also be included, as well as alkyl acrylate and hydrophilic monomers such as 2-hydroxyethyl methacrylate.

U.S. Pat. No. 4,540,761 describes an oxygen-permeable hard contact lens in which the physical properties are improved by the inclusion of 30–50 percent of an alkyl acrylate or methacrylate. The remaining monomers comprise certain siloxane acrylates or methacrylates, certain fluoroalkyl acrylates or methacrylates, acrylic or methacrylic acid, and a dimethacrylates and trimethylolpropane triacrylate or trimethacrylate.

U.S. Pat. No. 4,153,641 discloses oxygen-permeable contact lenses comprising cross-linked polymerizates of poly(organosiloxanes) alpha, omega terminally bonded through a divalent hydrocarbon group to a polymerized, activated unsaturated group.

The hard contact lenses described in copending, commonly-assigned U.S. patent application Ser. Nos. 734,898, abandoned, and 764,421 cited above provide high oxygen permeability required for continuous wear and improved physical properties when compared to those of previously known highly oxygen-permeable lenses composed largely of organosilicon monomers in the absence of fluoroalkyl monomers. However, such polymers still show a strong tendency to chip, break and stress craze during machining to produce contact lenses and during subsequent handling and use of the lenses. U.S. Pat. No. 4,540,761 describes an attempt to overcome the mechanical deficiencies of organosilicon-fluoroalkyl copolymer compositions by the addition of large (30–50 percent) amounts of alkyl acrylates or methacrylates, but such addition leads to a corresponding loss of the very high oxygen permeability required for continuous wear. By contrast, the crosslinked copolymer compositions of the present invention maintain very high oxygen permeability, while providing major improvements in mechanical properties as measured by tensile strength, percent elongation and toughness, resulting in elimination of chipping, breaking and stress crazing during manufacture and subsequent handling and use of the lenses.

SUMMARY OF THE INVENTION

In accordance with the invention, there are provided highly oxygen-permeable contact lenses of greatly improved mechanical properties, suitable for the forming and machining operations necessary for manufacture, and showing durability in subsequent handling and wear. The contact lenses of the invention are formed from the polymerization product of:

(a) at least one fluoroorgano monomer having the formula (I):

wherein $R_1$ is a hydrogen atom or a methyl group and Y is a fluorocarbon group having about 2 to about 10 carbon atoms and about 3 to about 21 fluorine atoms:

(b) at least one siloxyl alkyl ester having the formula (II):

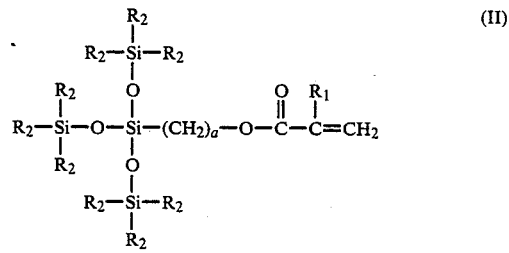

wherein $R_1$ is as described above, each $R_2$ is independently selected from the group consisting of methyl and phenyl groups, and a is 1, 3 or 4;

(c) a member of the group consisting of:
  (i) at least one poly(organosiloxane) monomer having the formula (III):

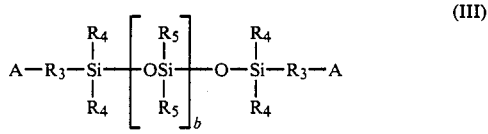

wherein A is an activated unsaturated group, $R_3$ is a divalent hydrocarbon radical having from 1 to 22 carbon atoms, each $R_4$ and $R_5$ is independently selected from the group consisting of a monovalent hydrocarbon radical or a halogen-substituted monovalent hydrocarbon radical having 1-12 carbon atoms, and b is 0 or greater, and (ii) mixtures of said poly(organosiloxane) monomers, and at least one optional crosslinking monomer having the formula (IV):

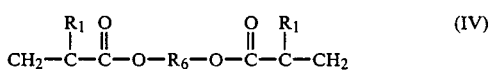

wherein $R_1$ is as defined above and $R_6$ is a divalent hydrocarbon radical having 2-12 carbon atoms: and (d) at least one hydrophilic monomer.

The monomer percentage by weight of the total monomers present ranges from about 30 to about 80 weight percent, preferably about 40 to about 70 weight percent for Class (a); from about 15 to about 50 weight percent, preferably about 20 to about 40 weight percent for Class (b); from about 4 to about 20 weight percent, preferably about 7 to about 15 weight percent for Class (c); and from about 1 to about 15 weight percent, preferably about 2 to about 10 weight percent for Class (d). The oxygen permeability, measured as described below, should preferably be greater than 50.

Highly preferred contact lenses of this invention are formed from the polymerization product of:
(a) hexafluoroisopropyl methacrylate,
(b) tris(trimethylsiloxy)silylpropyl methacrylate,
(c) at least one poly(organosiloxane) monomer having the formula (III) described above wherein A is methacryloxy, $R_3$ is tetramethylene, each $R_4$ and $R_5$ is a methyl group, and b is an integer from about 10 to about 50, and
(d) methacrylic acid.

In a distinct aspect of this highly preferred embodiment, neopentyl glycol dimethacrylate is added as an additional crosslinker.

DETAILED DESCRIPTION OF THE INVENTION

In the compound (I), $R_1$ is preferably a methyl group and Y is preferably a fluorocarbon group having about 2 to about 4 carbon atoms. As the number of carbon atoms in Y increases, the hardness of the resulting polymerization product decreases. This tendency toward decreased hardness may be compensated by employing increased amounts of neopentyl glycol dimethacrylate in the polymerization mixture. Especially preferred compounds of formula (I) are hexafluoroisopropyl methacrylate and trifluoroethyl methacrylate. Particularly preferred is 1,1,1,3,3,3-hexafluoroisopropyl methacrylate.

In the compound (II), $R_1$ and each $R_2$ are preferably methyl groups and a is preferably 3 or 4. A particularly preferred compound of formula (II) is tris(trimethylsiloxy)silylpropyl methacrylate.

With respect to compounds of formula (III), the term "activated unsaturated group" means an unsaturated group which has a substituent which facilitates free radical polymerization. In the compound (III), A is preferably selected from the group consisting of methacryloxy, acryloxy, acrylamido, and styryl, and more preferably is either methacryloxy or acryloxy. Methacryloxy radicals are particularly preferred. $R_3$ is preferably an alkylene radical, more preferably an alkylene radical having 1, 3 or 4 carbon atoms, especially 3 or 4 carbon atoms. $R_4$ and $R_5$ are preferably alkyl, cycloalkyl, aryl, aralkyl, alkaryl, haloaryl, or haloalkyl radicals having from 1 to 12 carbon atoms. Of the halogen-substituted radicals, fluoro-substituted, lower alkyl radicals having up to about 4 carbon atoms are preferred. Most preferably, $R_4$ and $R_5$ are methyl radicals. Subscript b is preferably from about 0 to about 50, more preferably from about 10 to about 30. Preparation of compounds of formula (III) is described in U.S. Pat. No. 4,153,641.

In the compound (IV), $R_1$ is preferably a methyl group and $R_6$ is preferably a branched-chain, divalent hydrocarbon radical, especially a radical having about 2 to about 10 carbon atoms. Neopentylglycol dimethacrylate is particularly preferred, although other compounds such as ethylene glycol dimethacrylate are within the broader scope of this invention. Polyglycol dimethacrylates such as diethylene glycol dimethacrylate and triethylene glycol dimethacrylate are avoided becaue they tend to soften the polymerization product and reduce oxygen permeability. When glycol di(meth)acrylates of formula (IV) are employed in the polymerization mixture, the weight ratio of poly(organosiloxane) monomer (III) to glycol di(meth)acrylate is preferably about 0.5-1.5:1, more preferably about 1:1.

Hydrophilic monomers are included in the polymerization product of this invention to enhance wettability of contact lenses manufactured therefrom. Examples of suitable monomers are unsaturated carboxylic acids (e.g., methacrylic and acrylic acids), acrylic substituted alcohols (e.g., 2-hydroxyethyl methacrylate and 2-hydroxyethyl acrylate), vinyl dibasic acids (e.g., itaconic and maleic acids), vinyl lactams (e.g., N-vinyl pyrrolidone), and acrylamides (e.g., dimethyl acrylamide). Unsaturated carboxylic acids (esp. methacrylic acid) are preferred hydrophilic monomers.

In addition to the monomers described above, the copolymer compositon of this invention may also include such additional material as the colorants known in the contact lens art, or UV-absorbing agents.

Polymerization may be carried out using conventional procedures, such as by using heat or radiation treatment of a homogeneous mixture of the monomers held in sheet form between layers of a non-adherent material such as Teflon. Radiation treatment may include treatment with ionizing, ultraviolet, or infrared radiation. Free radical polymerization initiators such as peroxides, azos, or percarbonates are preferably employed, in a concentration range of about 0.01 to 1 percent by weight of the total monomer mixture.

The shaping of the copolymer into contact lenses can be done by usual methods. For instance, polymerization may be conducted in a mold corresponding to a shape of a contact lens to give a copolymer having a contact lens shape directly. The thus-obtained contact lens may be further subjected to a mechanical finishing, as occasion demands. Also, the polymerization may be conducted in an appropriate mold or vessel to give a lens material in the form of button, plate or rod, and the lens material may then be subjected to the usual mechanical processing (e.g., cutting or polishing) to give a contact lens having the desired shape.

The following examples are illustrative only and should not be construed as limiting the invention. All percentages referred to herein are on a weight percent basis.

Comparative Examples A–B and Examples 1–4

The monomers for each of Comparative Examples A–B and Examples 1–4 were formulated as shown in Table I below. To the mixture of monomers was added 0.07 percent by weight of the polymerization initiator 2,5-dimethyl-2,5-bis(2-ethylhexanoylperoxy)hexane.
The mixture was homogenized, degassed and placed in a polymerization cell consisting of two Teflon-coated plates separated by an elastomer gasket and held by binder clips. After filling, the cell was purged with nitrogen, sealed and placed in an oven. The heating cycle consisted of 4 hours at 70° C. followed by 3 hours at 80° C. and 1 hour at 110° C. The resulting transparent sheet was then further heated for one hour at 120° C. After cooling, the plastic sheet was cut ino buttons which were shaped into corneal contact lenses using conventional contact lens machining procedures.

The monomers of the examples tabulated in Table I are identified as follows:
HFIPMa: 1,1,1,3,3,3-Hexafluoroisopropyl methacrylate
Maa: Methacrylic acid
TRIS: Tris(trimethylsiloxy)silylpropyl methacrylate
MMa: Methyl methacrylate
M2Dn:

NPGMa: Neopentylglycol dimethacrylate

The resulting oxygen permeability and mechanical properties are listed in Table II. Oxygen permeability $Dk(cm^3$ oxygen at $STP/s)(cm/cm^2 \times mmHg)$, was determined by the polarographic method of Fatt, International Contact Lens Clinic II, No. 3, March, 1984, pp. 175–183, and corrected for sample edge effects. The determinations were made at 35° C. Tensile strength $(g/mm^2)$, modulus $(g/mm^2)$ and percent elongation were measured according to the procedure of ASTM D-1708, Rockwell hardness by ASTM D-785, and Shore hardness by ASTM D-2240. Toughness (g-cm) was determined by doubling the area under the stress/strain curve.

The results listed in Table II show that the high level of oxygen permeability characteristic to the Comparative Example A, having a polymer composition as described by Stoyan, U.S. Ser. No. 734,898, were retained or even exceeded by the Examples 1–4 of the invention. Comparative Example B, in which 5 percent of the polymer consisted of methyl methacrylate, a conventional component of hard contact lenses, showed a decrease in oxygen permeability and little if any significant improvement in physical properties. However, the Examples 1–4 of the invention showed major increases in tensile strength, percent elongation, and toughness. Modulus values were retained or increased, while Shore and Rockwell hardness were not significantly reduced. The lenses of both comparative examples showed a strong tendency to chip, break and stress craze during machining of the contact lenses and during subsequent handling and use. The improvements in physical properties as measured for the polymer examples of the invention resulting in elimination of these defects under the same conditions of machining and handling as used for the comparative examples. The copolymers of the

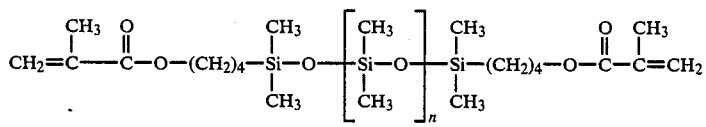

M2D50: M2Dn, n=50
M2D25: M2Dn, n=25
M2D10: M2Dn, n=10 invention were thus rendered fully suitable for the manufacture of contact lenses and their subsequent use, without impairing the high levels of oxygen permeability permitting prolonged wear.

TABLE I

| Example No. | MONOMERS, WEIGHT % | | | | | | | |
|---|---|---|---|---|---|---|---|---|
| | HFIPMa | Maa | TRIS | MMa | M2D50 | M2D25 | M2D10 | NPGDMa |
| A | 65.00 | 5.00 | 30.00 | — | — | — | — | — |
| B | 60.00 | 5.00 | 30.00 | 5.00 | — | — | — | — |
| 1 | 60.00 | 5.00 | 25.00 | — | 5.00 | — | — | 5.00 |
| 2 | 60.00 | 5.00 | 25.00 | — | — | 5.00 | — | 5.00 |
| 3 | 60.00 | 5.00 | 25.00 | — | — | — | 10.00 | — |
| 4 | 60.00 | 5.00 | 25.00 | — | — | — | 5.00 | 5.00 |

TABLE II

| Example No. | PHYSICAL PROPERTIES | | | | | | |
|---|---|---|---|---|---|---|---|
| | DK $\times 10^{-11}$ | Tensile Strength $\times 10^{-3}$ | Modulus $\times 10^{-3}$ | % Elong. | Hardness | | Toughness |
| | | | | | Rockwell R | Shore D | |
| A | 104 | 1.3 | 51 | 2.2 | 115 | 78 | 2.9 |
| B | 89 | 1.2 | 57 | 1.9 | 118 | 80 | 2.3 |
| 1 | 119 | 1.9 | 53 | 3.8 | 111 | 77 | — |
| 2 | 107 | 2.9 | 71 | 4.6 | 113 | 79 | 13.3 |

TABLE II-continued

| | | PHYSICAL PROPERTIES | | | | | |
|---|---|---|---|---|---|---|---|
| | | Tensile | | | Hardness | | |
| Example No. | DK $\times 10^{-11}$ | Strength $\times 10^{-3}$ | Modulus $\times 10^{-3}$ | % Elong. | Rockwell R | Shore D | Toughness |
| 3 | 130 | 2.5 | 58 | 4.5 | 108 | 76 | 11.3 |
| 4 | 103 | 2.5 | 66 | 4.5 | 115 | — | 11.3 |

Example 5

The procedure of Example 2 was repeated except trifluoroethyl methacrylate was substituted for the hexafluoroisopropyl methacrylate used in Example 2. Contact lenses produced from the resulting polymerization product had the following properties: DK of $50 \times 10^{-11}$, tensile strength of $2.5 \times 10^{-3}$, modulus of $80 \times 10^{-3}$, % elongation of 5.5, Rockwell hardness of 114, and toughness of 13.8.

What is claimed:

1. A polymerization product of:
   (a) about 30 to about 80 weight % of at least one fluoroorgano monomer having the formula $$CH_2 = C - C - O - Y$$
   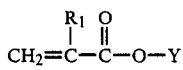

wherein $R_1$ is a hydrogen atom or a methyl group and Y is a fluorocarbon group having about 2 to about 10 carbon atoms and about 3 to about 21 fluorine atoms;

(b) about 15 to about 50 weight % of at least one siloxyl alkyl ester having the formula

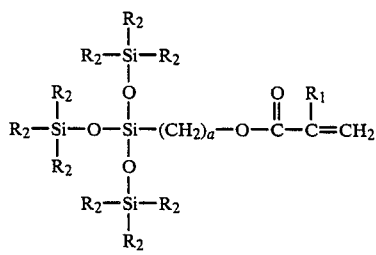

wherein $R_1$ is as described above, each $R_2$ is independently selected from the group consisting of methyl and phenyl groups, and a is 1, 3 or 4;

(c) about 4 to about 20 weight % of a member of the group consisting of:
   (i) at least one poly(organosiloxane) monomer having the formula

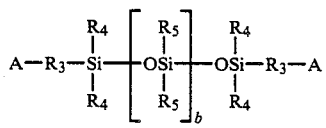

wherein A is an activated unsaturated group, $R_3$ is a divalent hydrocarbon radical having from 1 to 22 carbon atoms, each $R_4$ and $R_5$ is independently selected from the group consisting of a monovalent hydrocarbon radical or a halogen-substituted monovalent hydrocarbon radical having 1-12 carbon atoms, and b is 0 or greater, and (ii) mixtures of said poly(organosiloxane) monomers and at least one optional crosslinking monomer having the formula

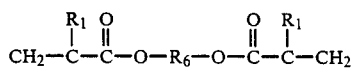

wherein $R_1$ is as defined above and $R_6$ is a divalent hydrocarbon radical having 2-12 carbon atoms; and (d) about 1 to about 15 weight % of at least one hydrophilic monomer.

2. The product of claim 1 wherein each $R_2$ is methyl.
3. The product of claim 2 wherein A is selected from the group consisting of methacryloxy and acryloxy.
4. The product of claim 3 wherein $R_3$ is a linear, divalent hydrocarbon radical having 3 or 4 carbon atoms.
5. The product claim 2 wherein each $R_4$ and $R_5$ is a methyl radical.
6. The product of claim 4 wherein each $R_4$ and $R_5$ is a methyl radical.
7. The product of claim 2 wherein each $R_4$ and $R_5$ is selected from the group consisting of methyl and fluoromethyl radicals.
8. The product of claim 2 wherein b is about 10 to about 30.
9. The product of claim 1 wherein said fluoroorgano monomer is selected from the group consisting of hexafluoroisopropyl methacrylate and trifluoroethyl methacrylate.
10. The product of claim 6 wherein said fluroorgano monomer is 1,1,1,3,3,3-hexafluoroisopropyl methacrylate.
11. The product of claim 10 wherein each $R_1$ is methyl.
12. The product of claim 2 wherein said optional crosslinking monomer is neopentyl glycol dimethacrylate.
13. The product of claim 2 wherein said hydrophilic monomer is methacrylic acid.
14. The product of claim 1 formed by polymerizing about 40 to about 70 weight % of monomer (a), about 20 to about 40 weight % of monomer (b), about 7 to about 15 weight % of monomer (c), and about 2 to about 10 weight % of monomer (d).

* * * * *